Feb. 20, 1968 C. G. BANDY ET AL 3,369,817
PREFORMED DEFORMABLE PLASTIC SLEEVE SEAL
Filed Dec. 7, 1964
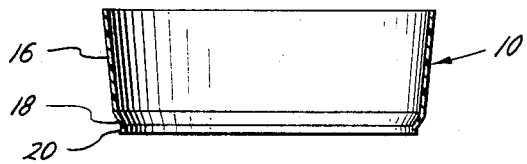
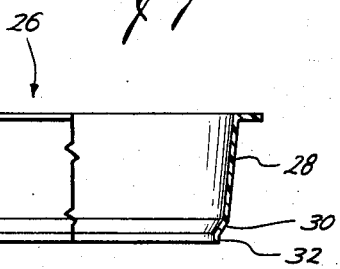
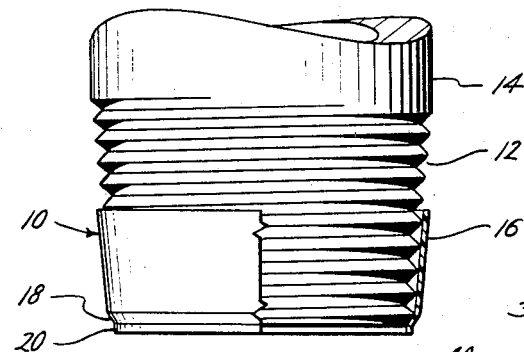
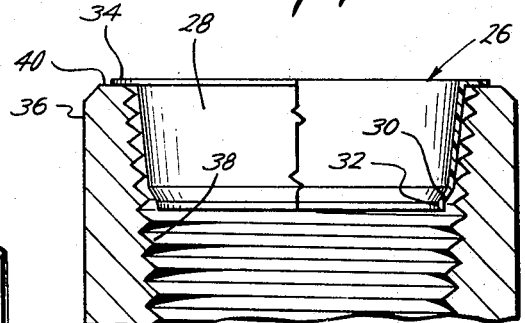
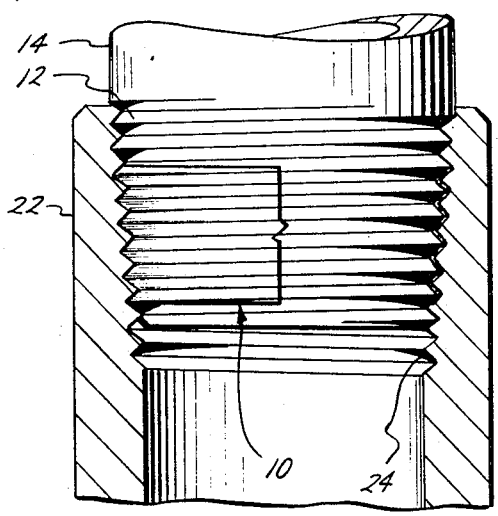
Charles G. Bandy
John C. Krepak
James R. Parker
John B. Parker
INVENTORS
BY
ATTORNEYS

United States Patent Office 3,369,817
Patented Feb. 20, 1968

3,369,817
PREFORMED DEFORMABLE PLASTIC
SLEEVE SEAL
Charles G. Bandy, John C. Krepak, and James R. Parker, Shreveport, La., and John B. Parker, Tenaha, Tex., assignors to Parkan, Inc., Shreveport, La.
Filed Dec. 7, 1964, Ser. No. 416,338
6 Claims. (Cl. 277—11)

The present invention relates to the sealing of threaded connections and more particularly to a pre-formed, deformable sealing element providing a seal between the threads of two members which are in threaded engagement.

Prior to the present invention many types of devices have been used to attempt to obtain a seal between threaded members. Seal rings have been positioned in a groove cut in the threads of one of the members. Seal ring gaskets have been provided between the pin end of the male member and a shoulder in the female member. Ribbons of sealing material have been wrapped around the threads of the male member with the threads of the female member when threaded on the male threads deforming the sealing material into a seal between the respective threads, as exemplified by U.S. Patent No. 3,002,770 issued Oct. 3, 1961.

These prior sealing devices have all had disadvantages. In some of the prior devices a considerable expense is involved in cutting a groove to receive the sealing ring or to provide a shoulder or recess in which the sealing ring is to be maintained. With the ribbon-type seal considerable care in wrapping the male threads must be taken to obtain a proper seal. Further, difficulty is encountered in many of the prior seals in installing the seal and also in maintaining the seal in proper position during the threading of one member into the other.

Therefore, it is an object of the present invention to provide a seal for the threads of two threaded members which is readily installed and maintained in proper position during the threading of one of the members into or on the other member.

A further object of the present invention is to provide a preformed, unitary sealing element comprising a unitary construction which is easily handled and which is readily installed in a threaded connection without special preparation of the threads of the members.

A still further object of the present invention is to provide a preformed, unitary sealing element of deformable material for a sealed threaded connection between threaded members in which said element may be placed in covering relationship with at least a portion of the threads of one member; said element including means to initially position the element upon the threads and thereafter to retain the position of one end of the element during initial threading of the members, whereby the element is progressively stretched and deformed and is finally disposed entirely between the threads of the coupled joint members to seal the joint.

These and other objects of the present invention are clearly set forth and explained in the following specification in relation to the drawings wherein:

FIGURE 1 is a sectional view of one form of sealing element of the present invention adapted to be installed on a male member;

FIGURE 2 is a view of the sealing element in FIGURE 1 installed on a threaded male member with the sealing element being shown partly in section;

FIGURE 3 is a partial sectional view of a threaded connection sealed by the sealing element of the present invention;

FIGURE 4 is a partial sectional view of another form of sealing element of the present invention adapted to be installed on a female member; and FIGURE 5 is a sectional view of the sealing element of FIGURE 4 installed in a threaded female member with the element being shown partly in section.

Referring more in detail to the drawings, the sealing element 10, illustrated in FIGURES 1 and 2, is shown in a configuration to be installed in covering relationship to a portion of male threads 12 of the male member 14. As shown, the threads 12 on the male member 14 are tapered threads, but it should be understood that the present invention has application to straight threads and other types of threaded connections.

Sealing element 10 has a sleeve shape and includes annular section 16, tapered section 18 and ring section 20; the internal diameter of annular section 16 is approximately the same as the outer or apex diameter of threads 12, so that it will readily slip onto the end of male member 14, as shown in FIGURE 2, and when so positioned will be touching the apex of the covered male threads 12. When the sealing element of the present invention is used with straight threads, annular section 16 will be cylindrical in shape and will be sufficiently large to be readily installed. The tapered section 18 of sealing element 10 extends from the smaller end of the annular section 16 and tapers inwardly, as shown, and connects to the ring section 20. Ring section 20 is cylindrical in shape and extends a short distance from the tapered section 18. The inside diameter of ring section 20 should be smaller than the smallest outside diameter of male member 14 and preferably smaller than the smallest root diameter of male threads 12.

The sealing element 26, illustrated in FIGURES 4 and 5, is substantially identical with sealing element 10 in that it includes an annular section 28, a tapered section 30 and a ring section 32. Further, sealing element 26 is provided with the flange 34 extending outwardly from the end of annular section 28 opposite to the end connecting to tapered section 30.

As previously mentioned, sealing element 26 is designed to be used with female member 36. Sealing element 26 is inserted into the interior of female member 36 in covering relationship to at least a portion of the female threads 38 within female member 36. The outer diameter of sealing element 26 should be slightly less than the inner diameter of the female threads 38 covered by sealing element 26. Flange 34 is designed to abut the end surface 40 of female member 36 when sealing element 26 is properly installed, as shown in FIGURE 5. With flange 34 abutting end surface 40 of female member 36 and with the remainder of sealing element 26 positioned on the interior of female member 36, a male member (not shown) may be threaded into female member 36, and flange 34 will prevent longitudinal movement of that end of sealing element 26 with respect to the female member 36 during initial threading until the male member engages the tapered section 30; thereafter, as threading progresses, sealing element 26 will be deformed both radially and longitudinally of the threaded connection.

Since the sealing element 10 is preferably made from a material which is pliable, it has been found necessary to provide a means for preventing the moving of the whole of sealing element 10 either upwardly on the male member 14 when the form, shown in FIGURES 1 and 2, is used or downwardly into the female member 36 when the female form of the sealing element, as shown in FIGURES 4 and 5, is used. Without such means, a sealing element might be pushed ahead of one of the members during the threading of the members to a degree that it would not be engaged between the threads.

It has been found that sintered or unsintered Teflon (polytetrafluoroethylene) or similar material will have desired characteristics for the sealing element of the present invention. The material used for the sealing element should be readily deformable and capable of being deformed to conform to the shape between male and female threads without failure. The thickness of material used for the sealing element of the present invention should be greater than the space between the male and female threads when the joint is fully made up. Normally in using polytetrafluoroethylene, material thicknesses in the range from 5 to 20 thousandths of an inch have been found to be satisfactory, but greater thicknesses of material are contemplated where thread tolerances are large or for use with used pipe. Having sufficient thickness of material for the sealing element is particularly important in applications to straight threads and tapered threads having a bottoming shoulder.

The threaded connection, shown in FIGURE 3, is started by placing the sealing element 10 in covering relationship to at least a portion of the male threads 12 of the male member 14, as illustrated in FIGURE 2. The male member 14 is then threaded into female member 22. During initial threading of the members, the tapered section 18 on sealing element 10 will be in engagement with the end of male member 14 and will retain that end of annular section 16 against movement with respect to male member 14, while the remainder of the annular section 16 is being engaged by the threads and progressively stretched and deformed by such engagement. The continued threading of the male and female members will cause the restraint of tapered section 18 to be overcome. Thereafter, the tapered section 18 and the ring section 20 will move between the threads and be stretched and deformed. When the joint coupling is complete, sealing element 10 will be entirely disposed between the threads of the members providing a sealed joint. The ring section 20 provides a reservoir of material to insure a seal where the threads 12 and 23 may be worn, damaged or where the tolerances on the threads are excessive. The initial threading engagement will cause deformation of the annular section 16 to conform to the shape of the threads and will stretch sealing element 10 in a longitudinal direction because of the restraint to movement supplied by the tapered section 18.

During the initial threading of the form of the invention, illustrated in FIGURES 4 and 5, the sealing element 26 is initially positioned in covering relationship to at least a portion of the female threads 38 of the female member 36 and with the flange 34 resting or abutting on the end surface 40 of the female member 36, as shown in FIGURE 5. A male member is then inserted into the interior of the sealing element 26 and threading between the members is commenced. The sealing element 26 will be engaged by the threads 38 on the female member 36 and the threads on the male member, and the abutment of flange 34 on surface 40 will resist longitudinal movement of the flanged end of sealing element 26 within the female member 36 until the end of the male member engages the tapered section 30. At this point tapered section 30 will resist longitudinal movement of the tapered end of seal member 26 with respect to the male member, and this resistance will cause the sealing element 26 to be further stretched and deformed. When the threading is completed, the position of the male member, the female member 36 and the sealing element 26 will be substantially as shown in FIGURE 3, with the sealing element 26 having been stretched and deformed throughout its length into sealing engagement in the space between the respective threads of the male member and the female member 36. Further tightening of a tapered thread connection will only serve to compress sealing element 26, but once the sealing engagement has been achieved, no further tightening would be necessary.

It should be noted that the sealing element of the present invention may be generally sleeve-shaped and installed in covering relationship to at least a portion of the threads of one of the joint members with a portion of the sleeve projecting outwardly therefrom. Particularly, where the joint members have tapered threads, a sleeve-shaped sealing element will be preformed to be tapered to conform to such thread, and the action of the sealing element during coupling of the joint will provide the initial positioning of the sealing element with respect to the member on which it is positioned and will also provide a restraint to movement which will cause the engaged portion of the sealing element to be progressively stretched and deformed until the coupling of the joint is complete and the sealing element is positioned in sealing engagement between the threads of the joint.

From the foregoing it may be seen that the present invention provides an inexpensive and readily installed seal for a threaded connection. The sealing element, being preformed, provides a limit to its positioning on one of the members and further provides a restraint at one end against movement when coupling is begun whereby progressive stretching and deformation of the element result; and when the coupling is complete, the sealing element is entirely disposed between the threads of the joint members.

What is claimed is:

1. A unitary preformed sealing element of polytetrafluoroethylene material adapted to be used to seal a threaded joint including a male member having external threads and a female member having internal threads adapted to receive said threads of said male member, said sealing element comprising, a frusto-conical deformable annular sleeve section having a size to readily fit in covering relationship to at least a portion of the threads of one of the joint members, said sleeve section when installed on said one of said joint members having a size to be in close spaced relationship to the apices of the covered threads with each longitudinal portion of the sleeve section between adjacent apices extending in a substantially straight line, and a deformable retaining section extending from said sleeve section and having a diameter approximately the same as the root diameter of the threads at the end of said one of said joint members, whereby when said joint members are connected, said retaining section initially retains said sleeve section to assure positioning of said sealing element between the threads of said joint members, and whereby said annular section is progressively stretched and deformed and the entire sealing element is disposed between the threads of said threaded joint members.

2. A unitary preformed sealing element according to claim 1, wherein said annular sleeve section has a size sufficient to fit over a portion of the threads of said male member, and said retaining section tapers to a diameter smaller than the smallest root diameter of said threads on said male member.

3. A unitary preformed sealing element according to claim 2, including a cylindrical reservoir section extending from the small end of said retaining section and having a diameter approximately the same as the smallest diameter of said retaining section.

4. A unitary preformed sealing element according to claim 2, including a flange section extending radially outward from the larger end of said sleeve section.

5. A unitary preformed sealing element adapted to be used to seal a threaded joint including a male member having tapered external threads and a female member having tapered internal threads adapted to receive said threads of said male member, said sealing element comprising,
- a frusto-conical sleeve section having a size to readily fit in covering relationship to at least a portion of said threads on said male member,
- said sleeve section having a taper corresponding substantially to the taper of said threads on said male member, and
- a retaining section extending inwardly from the smaller end of said sleeve to an inner diameter not greater than the smallest root diameter of said threads on said male member,
- said sleeve and retaining sections being composed of a deformable polytetrafluoroethylene sealing material having a thickness greater than the space between the threads in the male and female members when joined whereby said annular section is progressively stretched and deformed and the entire sealing element is disposed between the threads of said threaded joint members.

6. A unitary preformed sealing element according to claim 5 wherein,
said sealing material has a thickness in the range from 5 to 20 thousandths of an inch.

References Cited

UNITED STATES PATENTS

| | | | |
|---|---|---|---|
| 2,407,552 | 9/1946 | Hoesel | 285—355 |
| 1,875,708 | 9/1932 | Couhig. | |
| 2,121,436 | 6/1938 | Lytle | 138—96 |
| 3,002,770 | 10/1961 | Chestnut et al. | |

FOREIGN PATENTS

| | | |
|---|---|---|
| 770,774 | 3/1957 | Great Britain. |

SAMUEL ROTHBERG, *Primary Examiner.*